United States Patent Office 3,840,452
Patented Oct. 8, 1974

3,840,452
ELECTRODE FOR MEASURING CONCENTRATION OF CHOLINE AND ITS ESTERS
George Baum, Corning, and Merrill Lynn, Big Flats, N.Y., assignors to Corning Glass Works, Corning, N.Y.
Filed June 23, 1972, Ser. No. 265,778
Int. Cl. G01n 27/46
U.S. Cl. 204—195 M      10 Claims

ABSTRACT OF THE DISCLOSURE

Electrode for measuring the concentration of choline and its esters in an aqueous solution wherein the sensing portion is a polyvinyl chloride membrane containing a substituted tetraphenylborate dissolved in an organic solvent which also plasticizes the PVC. Methods of preparing and using the electrode are disclosed.

BACKGROUND OF THE INVENTION

Electrodes for determining ion concentrations in aqueous solutions are well known. Electrodes have been designed to measure both cationic and anionic concentrations. To measure such concentrations, two electrodes are commonly used; a sensor electrode and a reference electrode. In use, the two electrodes are connected to an electrometer and then immersed in an aqueous test solution. Depending on the construction of the sensor electrode and the extent of ionic activity in the test solution, an electrochemical potential is developed. This results in a potential reading on the electrometer. Since ionic activity is a measure of ionic concentration, the potential reading on the electrometer can be translated into a measure of ionic concentration in a given test solution.

The choice of sensor electrode depends on the type of ion concentration to be measured. For cationic concentration measurements, the sensor electrode must be sensitive to cationic activity; where anionic concentrations are to be determined, the electrode must be sensitive to anionic activity. For a sensor electrode to be usefully sensitive to the activity of a particular ion, the electrode should be of such a nature that it senses the activity of that particular ion in preference to the activities of other ions which may be present in a test solution.

The preference of a sensor electrode for certain ions is commonly referred to as the selectivity of the sensor electrode for certain ions over other ions. This selectivity is governed by the tendency of the sensitive portion of the sensor electrode to sense given test ions over other ions at the same concentration. Thus, if the sensitive portion of the sensor electrode is of such composition as to sense more readily the test ion activity, the EMF noted on the electrometer will be mainly attributable to the test ion activity. This, in turn, provides an indication of test ion concentration.

Ideally, ionic concentration is related to ionic activity and EMF through the following relationship:

$$\mathrm{EMF} = E^\circ + \frac{RT}{nF} \ln A = E^\circ + \frac{0.059}{n} \log A \ (25^\circ \ \mathrm{C.})$$

where EMF is the electrode potential, $E^\circ$ is a constan, $n$ is the ion charge ($\pm$) and A is the activity of the specific ion in solution. From the above equation, it can be seen that, ideally, a change in activity (A) equivalent to one order of magnitude causes a 59 mv. potential change when the ion is univalent and about a 30 mv. or 20 mv. change, respectively, when the ion is bivalent or trivalent. Thus, since a change in EMF represents a change in test ion activity, and since test ion activity can be releated to test ion concentration, a noted change in EMF can be used to indicate test ion concentrations.

When a second ionic species to which the electrode will also respond is present, the observed potential can be described by the relationship $$\mathrm{EMF} = E^\circ + \frac{0.059}{n} \log(A + KB)$$

where B is the activity of the secondary ion and K is the selectivity ratio. It is desirable to construct electrodes so that K is small in order to reduce the interference of B when measuring the activity of A.

As noted above, the ion sensitive portion of a sensor electrode determines which ion concentrations can be measured. Typically, the ion sensitive portion is in electrical contact with an electrometer. The second electrode used, a standard reference electrode such as a standard calomel electrode (SCE), is also connected to the electrometer. When the sensor electrode and reference electrode are immersed in a test solution, changes in EMF will generally be attributable to changes in the activity of a particular ion which is sensed by the sensitive portion.

Sensor electrodes are available to measure a wide variety of inorganic ions such as $H^+$, $Na^+$, $K^+$, $Ag^+$, $Cu^+$, $Ca^{+2}$, $F^-$, $Cl^-$, $Br^-$, $I^-$, and $NO_3^-$. Recently there has been disclosed a sensor electrode which can measure the concentration of the organic cations of choline and its esters.

Choline, trimethyl (2-hydroxylethyl) ammonium hydroxide, $[(CH_3)_3NCH_2CH_2OH]^+OH^-$, is an important nutritional substance. It is very soluble in water and absolute alcohol. It is stable in dilute solutions, but in concentrated solutions tends to decompose at a temperature of about 100° C. Frequently, choline is used in the form of its salts, one of the most common being the chloride, $[(CH_3)_3NCH_2CH_2OH]^+Cl^-$. The esters of choline are of great physiological interest, especially acetylcholine chloride $[(CH_3)_3NCH_2CH_2OCOCH_3]^+Cl^-$, which is thought to be essential in the transmission of nerve impulses. Because choline and its esters often occur in relatively low concentrations, and because of the interest in knowing their concentrations, attention has been directed toward providing a satisfactory electrode for measuring the concentration of choline and its esters. The present invention represents a significant improvement over an earlier electrode sensitive to choline and its esters. The earlier electrode is discussed uinder the heading, "Prior Art."

PRIOR ART

Some of the earlier and present ion sensing electrodes utilize an electrode having a sensor portion consisting of a glass material. Such glass electrodes are well known and have been used to measure the concentration of such ions as $H^+$, $Na^+$, and $K^+$. Examples of such electrodes can be found in U.S. Pat. No. 2,829,090 issued to G. Eisenman et al.

A more recent type of electrode utilizes a sensor portion consisting of an organic liquid membrane at which ionic exchange occurs through an interface between the organic ion exchange material and a test solution. By choosing an appropriate organic sensing phase for the organic ion exchange material, electrodes can be constructed to measure a wide variety of ions such as $Ca^{++}$, $K^+$, and the like. Examples of such electrodes may be found in U.S. Pat. No. 3,429,785 issued to J. W. Ross and U.S. Pat. No 3,598,713 issued to G. Baum and W. Wise. Since ion sensing in the above electrodes takes place at an aqueous-organic phase interface, various methods have been devised to minimize leakage between the aqueous and the organic sensing phases. In U.S. Pat. No. 3,438,886, issued to Ross, and U.S. Pat. No. 3,449,032, issued to Settzo et al., there are disclosed various porous hydrophobic-organophilic membrane materials which can be used to separate the organic and aqueous phases while still permitting an ion sensing interface. By minimizing organic phase to aqueous phase leakage, the above disclosed membrances tend to prolong sensor electrode life.

The above disclosures relate to electrodes for measuring inorganic ions. A more recent disclosure, U.S. Pat. No. 3,632,483, assigned to the same assignee as the present disclosure, describes an electrode for determining the concentration of the organic ions of choline and its esters. The sensing portion of that electrode utilizes a liquid organic sensing phase consisting of a substituted tetraphenylborate dissolved in a suitable organic solvent. The electrode has demonstrated high selectivity for choline and its esters in the presence of such ions as $N^+$, $K^+$, and $Ca^{++}$ and it can measure the concentration of choline and its esters at relatively low levels. Although that electrode has been used in applications such as the determination of cholinesterase activity in serum, a number of operating difficulties have limited its overall utility. For example, to prevent "poisoning" of the electrode by exogenous proteins in serum, it is usually necessary to provide a cellophane barrier between the porous membrane support for the organic phase and the test solution. This cellophane barrier must be replaced at regular intervals. Often the cellophane traps an air or water pocket, leading to erratic electrode behavior. Further, it has been found that the porous support membrane, commonly made of glass frit, is easily plugged or partially plugged, thus leading in time to an electrically noisy and unstable electrode.

It should be pointed out, however, that such problems also have been associated with other liquid organic ion exchange electrodes that have been used to measure ion concentrations in serum. For example, even though the cellophane and the porous discs used for known liquid ion exchange electrodes can be replaced periodically, the new membranes must be first carefully saturated with the exchanger solution and then equilibrated with an electrolyte solution.

Because of these common problems associated with electrodes having a liquid organic phase, further attempts have been made to improve the operating characteristics of such electrodes by modifying the membrane interface at which ion sensing occurs.

One of the more recent publications describing such attempts is an article by G. J. Moody et al., "A Calcium-Sensitive Electrode Based on a Liquid Ion Exchange in a Poly(vinylchloride) Matrix," Analysis 95, 910 (1970). In the above article, methods are disclosed for preparing an electrode having an ion sensitive membrane of polyvinylchloride which contains an ion sensing organic phase for sensing $Ca^{++}$ activity. The sensing phase is a liquid ion-exchanger incorporated in a PVC matrix. Various operational advantages are disclosed for the PVC membrane. One of the more significant advantages disclosed was an operational lifetime of greater than 18 months. Another cited advantage for the disclosed polymer membrane is that the need for an inert support material is avoided. Consequently, any ill-defined interface problems associated with such supports are minimized.

A recent publication by T. Higuchi et al. in *Anal. Chem.* 42, 1674 (1970) discloses the use of plastic membrane electrodes for measuring the concentration of such organic ions as the tetrabutylammonium ion and the tetraphenylboron ion. In that disclosure, the sensing plastic membranes disclosed are used for measuring the concentrations of relatively hydrophobic organic cations and anions. The membranes prepared by Higuchi et al. consist only of a plasticized polyvinylchloride film, and no ion-exchange salt is present.

We have now found that a polymer membrane can be made which will measure the concentration of hydrophilic organic ions; namely, the ions of choline and its esters.

SUMMARY OF THE INVENTION

We have prepared an improved electrode sensitive to choline and its esters wherein the improvement consists of a polymer membrane of plasticized polyvinyl chloride containing a dissolved salt sensitive to choline and its esters. The electrode comprises an insulating body having an opening at a portion thereof and a membrane disposed in covering relationship across the opening. The membrane comprises a polyvinyl chloride matrix containing a substituted terephenylborate salt which is dissolved in a solvent which is a suitable plasticizer for the polyvinyl chloride plastisol from which the membrane matrix is formed. The membrane has two essentially distinct faces, an outer face and an inner face. The outer face can be contacted with the aqueous test solution with the contacting portion forming an interface where the ion exchange occurs. The inner face of the membrane is in electrical contact with an internal reference electrode contained within the insulating body and electrically insulated from the aqueous test solution. The internal reference electrode may be of any conventional type, such as that comprising a silver chloride bead on a silver wire with which an electrolyte salt bridge may be used. An alternative construction involves coating a conducting metal wire such as copper or silver with the membrane. The metal wire then serves as the internal electrode.

SPECIFIC EMBODIMENTS

Figure 1:
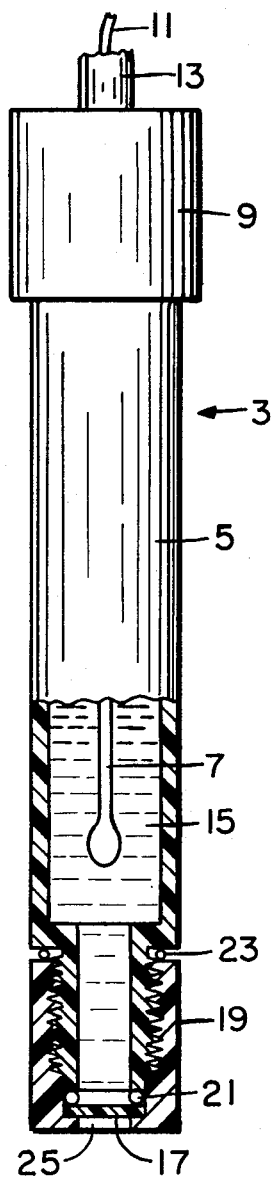
FIG. 1 represents a partial cross sectional view of a representative electrode formed according to the principles of the present invention.

The main body or housing of our electrode may be similar to most of the electrode bodies found useful for containing the ion sensitive organic phase of liquid organic ion exchange electrodes. Such bodies are well known and they have a variety of configurations. Generally, they consist of an elongated tube of an insulating material such as glass or plastic having openings at each end. One opening serves to admit and hold in place a lead from an internal reference electrode contained within the tube. The other opening serves as a passageway for ion exchange between an aqueous test solution and an ion sensing phase also contained within the tube. In the case of known electrode bodies housing an ion sensing liquid organic phase, a porous membrane, preferably hydrophobic-organophilic, is used to cover the sensing opening of the electrode body, thereby mechanically supporting the organic liquid phase and minimizing or preventing leakage between the aqueous test phase and the organic sensor phase.

In our electrode, the organic sensing phase for choline and its esters is contained within the body of a polyvinyl chloride membrane which also serves to keep the aqueous test phase separate from the salt bridge solution of the internal reference electrode. To prepare a satisfactory membrane for our electrode, we have found that only certain groups of compounds can be used as suitable plasticizers for a PVC plastisol resin since such compounds must also serve as effective solvents for the substituted tetraphenylborate salt needed to sense the activity of choline and its esters. Thus, such compounds, which may be designated as suitable solvent-plasticizers must serve two functions. Firstly, they must be effective solvents for the substituted tetraphenylborate sensing salt such that he ion sensing salt demonstrates choline ion selectivity in the presence of other ions. Secondly, they must also be effective in plasticizing a PVC resin to form a structurally sound, easy-to-make PVC membrane containing the sensing salt in a solvent-plasticizer solution.

It has been found that there are three groups of compounds which accomplish the above two goals and hence make good solvent-plasticizers. The first group includes aromatic diesters of the following formula:

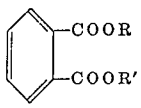

wherein R and R' represent alkyl groups having 4 to 18 carbon atoms. When alkyl groups below $C_4$ are utilized, the compounds are not good plasticizers for the PVC resin and tend to result in undesirably brittle membranes. When the alkyl groups are above $C_{18}$, the compounds have a high melting point, and tend to be waxy or solid, thus having viscosities which make it difficult to form the membranes. Because the viscosity of the solvent-plasticizers is important for both forming the membrane (where it must be low enough to facilitate PVC membrane formation) and solvating the sensor salt (where it should be high enough to minimize sensor phase-aqueous phase leakage) our preferred alkyl groups for these solvent plasticizer compounds have between 4 and 12 carbon atoms, the total of both alkyl groups preferably not exceeding 24 carbon atoms. Our especially preferred aromatic diester is dibutylphthalate. Aromatic monoesters are to be avoided as it is thought they are too volatile to serve as effective solvent-plasticizers.

A second group of compounds which serve as good solvent-plasticizers include trialkylphosphates which, as in the case of the aromatic diesters, have alkyl groups ranging from $C_4$ to about $C_{18}$ for the same reasons. Preferably, the trialkylphosphate alkyl groups are between $C_8$ and $C_{12}$ to provide a high enough viscosity to minimize leakage yet low enough viscosity to permit easy PVC membrane formation. Examples of such trialkylphosphates which serve as good solvent-plasticizers are trioctylphosphate and tributylphosphate.

The third group of compounds which serve as good solvent-plasticizers are nitroaromatic compounds of the following formula:

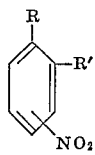

wherein R is a member selected from the group consisting of hydrogen, an alkyl group of 1–14 carbon atoms, lower alkoxy, and alkylcarboxy, and R' is a member selected from the group consisting of hydrogen and an alkyl group having less than 4 carbon atoms. As in the case of the other solvent-plasticizers, the nitroaromatic compound limitations are based primarily on viscosity considerations which determine the lower and upper limits for the molecular weights and chain lengths of substitution groups. Again, too low a viscosity will tend to promote undesirable leakage between the aqueous phase (test solution) and the sensor phase. Too high a viscosity hinders formation of a good membrane matrix from the PVC plastisol. Typical nitroaromatic compounds which act as good solvent-plasticizers are p-hexylnitrobenzene and p-nitrophenyl octyl ether.

Suitable resins which may be used for membrane formation include many vinyl resins which are commercially available. Examples of such resins are the high molecular weight predominantly vinyl chloride polymers such as Bakelite Vinyl Dispersion Resin QYOH–2®, Geon 121®, and Exon 654®. A preferred resin consists of polymer units having an average molecular weight of about 50,000–100,000.

The ion exchange materials for our electrode membrane are identical to those disclosed in U.S. Pat. No. 3,632,483. Such materials are substituted tertaphenyl borates represented by the following formula:

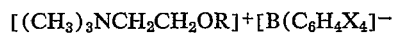

wherein X is chloride or phenoxy, R is hydrogen or

and R' is a lower alkyl group or phenyl. Such choline or choline ester sensing salts are more fully described in the above patent, incorporated therein by reference.

Generalized steps for preparing an electrode employing the present principles can be set forth as follows:

1. The substituted tetraphenylborate salt is dissolved in one of the solvent-plasticizers such that the resulting solution comprises about .5–5% by weight salt with a preferred range being about 1–3% by weight salt to assure a sufficient amount of salt for ion sensing.

2. Next the PVC plastisol resin is dispersed in the solution of 1. The amount of resin in the dispersion may range from about 30–60% by weight but a preferred amount of resin is about 50% by weight.

3. After dispersion of the plastisol rsein in the solution of 1, the membrane material is cast by conventional techniques so that the resulting sheet of PVC containing the solvent-plasticizer and salt will have a thickness of between about 6–50 mils, preferably between 10–25 mils. It was found that the electrochemical behavior of our membrane electrodes is related to membrane thickness. Thin film (less than 6 mils) did not act as permselective membranes (e.g., the observed potential across the membrane was not altered by dilution of the sample). On the other hand, films exceeding 50 mils exhibited extreme electrostatic sensitivity and their electrochemical characteristics were difficult to examine. These effects are believed to be related to the resistance of the membrane. The membrane formation and control of its thickness may be accomplished via such conventional techniques as with a doctor blade or mold, or by rolling, pressure molding, or extruding the membrane material.

4. Once the membrane material has been cast, it is fused for a short time at a temperature between about 140°–240° C. with a preferred temperature between 180°–200° C. for about two minutes.

5. Once fused, the membrane material can be cut to shape in the form of a disc which will serve as the ion sensitive membrane covering an opening of the electrode housing. The cut disc may be held in place over the sensing opening of the electrode housing by any conventional means such as with an O-ring, or by gluing to the outer rim of the opening with a cement (e.g., a water insoluble adhesive such as an epoxy, urethane or cyanoacrylate adhesive) which will not interfere with the ion sensing function of the membrane. By forming the membrane material in sheets larger than that actually needed for the disc, a number of advantages are seen. For example, since the sheets can be stored, added membranes can be cut as needed for replacement. Further, by attaching the disc to the electrode housing in a removable manner (e.g., with an O-ring or the like) the membrane can be easily disposed of before moving from test solutions of greatly different chemical composition. Since the formation of the membrane sheet is a relatively easy and inexpensive process, it may be more economical to use a new disc for each measurement even though one of the primary advantages of the present membranes is their relatively long sensor life compared to known liquid organic sensing phases.

Figure 2:
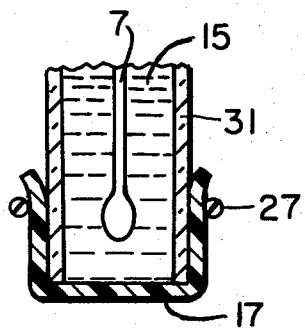
FIGS. 2 and 3 represent cross sectional views of representative modifications of the lower portion of FIG. 1.
Figure 3:
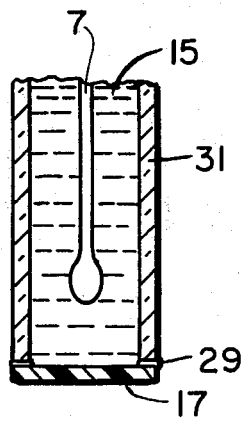

The actual construction of our electrodes can be better understood by referring to FIGS. 1–3. In FIG. 1, an electrode 3 consists of a palstic housing 5 in which is contained an internal reference electrode 7 held in place by a housing cap 9 which is of an insulating material such as rubber. The housing cap 9 can hold the internal reference electrode 7 in place by friction or other means.

A lead 11, in electrical contact with the internal reference electrode 7 and insulated by an insulating material 13 extends from the electrode cap 9 and is connectable to an electrometer. Contained within the electrode housing 5 is a conventional salt bridge solution 15 in electrical contact with the internal reference electrode 7 and the membrane 17. The membrane 17 is held in place by an internally threaded plastic cap 19 which engages mating threads on the lower portion of the housing 5. The membrane 17 is further secured with the aid of an O-ring 21 which helps retain the membrane during assembly. A similar O-ring 23 may be used to assure a tight fit of the cap 19 against the housing 5.

The outer face of the membrane 17 provides an interface for ion sensing through an opening 25 in the membrane retaining cap 10. The inner face of the membrane 17 is in electrical contact with the salt bridge solution 15.

FIGS. 2 and 3 illustrate two other ways the membrane 17 may be attached to the sensing ends of glass electrode housings 31 which do not require threaded portions to engage a threaded cap such as that shown in FIG. 1. In FIG. 2, the mmebrane 17 is shown held in place by a nO-ring 27. In FIG. 3 the membrane is shown held in place by a suitable cement 29. Other methods for attaching the membrane 17 to the sensing end of an electrode housing are, of course, possible. The main requirement is that the membrane act as a barrier supporting the salt bridge solution, when used, thereby keeping its from leaking into the test solution or vice versa.

Our initial membranes were prepared by using as solvent-plasticizers the acetylcholine exchanger solvent systems described in U.S. Pat. No. 3,632,483. Although functional electrodes resulted, it was found that these earlier polymer membranes (films) had poor mechanical properties such as low tear strength and a limited useable lifetime. After about 1–2 weeks of use, the performance of the electrodes deteriorated and they could no longer be used. Other solvent-plasticizers were then considered to find which solvent-plasticizers would accomplish best the two-fold purpose as solvent for the borate salt and as plasticizer. Dioctylphthalate, di-isononylphthalate, and mixed systems such as those containing 50% (wt.) 1,2-dimethyl-3-nitrobenzene gave operable membranes but without the desired long life. However, when dibutylphthalate was used as a solvent-plasticizer for the ion exchange salt and the PVC, the resulting membranes were found to have excellent electrical stability, a long life, and generally excellent overall electrode characteristics. An added advantage found in using the dibutylphthalate solvent-plasticizer was that operable membranes could be cut from polymer sheets which had been stored for several weeks. In contrast, it was found that membranes prepared with dioctylphthalate had shorter life times when those polymer sheets were stored for a period of time.

Although the membrane preparation is subject to various modifications, our membranes are preferably prepared as plastisols by incorporating the exchanger salt solution in a vinyl dispersion resin. Vinyl dispersions are suspensions of resin in liquids which do not dissolve the resin at ordinary temperatures. In a plastisol, the vinyl resin particles are dispersed into a plasticizer, the mixture is cast, drawn, or sprayed into a thin film, and then the mixture is heated to fuse the particles and form a continuous film. In our membranes the salt dissolved in the solvent-plasticizer becomes an integral part of this film.

Other less desirable methods for utilizing resins require a solution of the resins at low concentrations or the manipulation of the resin in a molten state. The first method places severe limitations on the type and molecular weight of the resins that can be utilized, and the second method requires undesirably high temperatures, and the use of expensive equipment. The vinyl dispersion technique avoids these limitations and permits the use of high molecular weight vinyl chloride homopolymers which cannot be used in the solution process. These higher molecular weight homopolymers produce strong, flexible films when used as plastisols.

Not all of our solvent-plasticizers are commonly used as plasticizers for PVC. For example, in one of our initial membranes, 3-nitro-o-xylene was used as the solvent-plasticizer. Although a functioning electrode membrane resulted, the performance tended to deteriorate in time and the membrane became embrittled. Higher quality membranes were later produced using some of the more conventional plasticizers for the PVC which would also serve as suitable solvents for the substituted tetraphenylborate salt. After preparing our ion sensing membranes with various solvent-plasticizers, it was found that one of the better solvent-plasticizers was dibutylphthalate. In the examples below, electrodes having a membrane plasticized with that diester were used and specific directions for the preparation and use of such electrodes are given. It is intended that the following examples should be illustrative only as to the preparation and use of a particularly preferred electrode.

EXAMPLE I

Preparation of Membrane

A 5% by weight solution of acetylcholine tetra (p-chlorophenyl) borate in dibutylphthalate was prepared. This solution was used as the plasticizer for the plastisol type PVC powder, Vinyl Dispersion Resin QYOH–2 (Union Carbide Corporation). A paste of 50% by weight of the solvent-plasticizer was mixed well with the plastisol PVC powder. The paste was spread in a mold such that the thickness of the resulting membrane would be between 10–25 mils and heated to 200° C. for two minutes. The resulting membrane was removed after cooling to room temperature. A small disc, smaller than the diameter of the electrode barrel was cut from the sheets.

Construction of the Electrode

The above disc (0.232 inch diameter) was placed into the bottom cap of a membrane assembly device for attaching membranes to electrode barrels. A small O-ring was placed behind the disc to prevent twisting of the membrane when the electrode assembly was to be screwed together. See FIG. 1. The chamber behind the disc (e.g., inside of the barrel) was filled with a saturated KCl-AgCl solution and an Ag/AgCl electrode was placed in contact with the internal electrolyte solution. Although a double junction internal reference electrode or similar internal reference electrode can be used, all of our measurements were made with the Ag/AgCl electrode dipped directly into the internal electrolyte. All potential measurements were made against a Fisher 13–639–57 cracked bead calomel reference electrode, hereinafter referred to as S.C.E. The electrometer used for making the indicated measurements was a Corning Model 12 pH meter.

TABLE I.—RESPONSE TO SELECTED IONS

| | E.M.F. (mv. vs. S.C.E.) | K* |
|---|---|---|
| Cation at $10^{-1}$ M: | | |
| $Na^+$ | −290 | 26.3 |
| $K^+$ | −241 | 3.37 |
| $NH_4^+$ | −273 | 12.9 |
| Choline | −212 | 1.0 |
| Acetylcholine | −181 | 0.27 |

*Selectivity ratios, calculated from simple electrolyte solutions at 0.1 M concentration.

Figure 4:
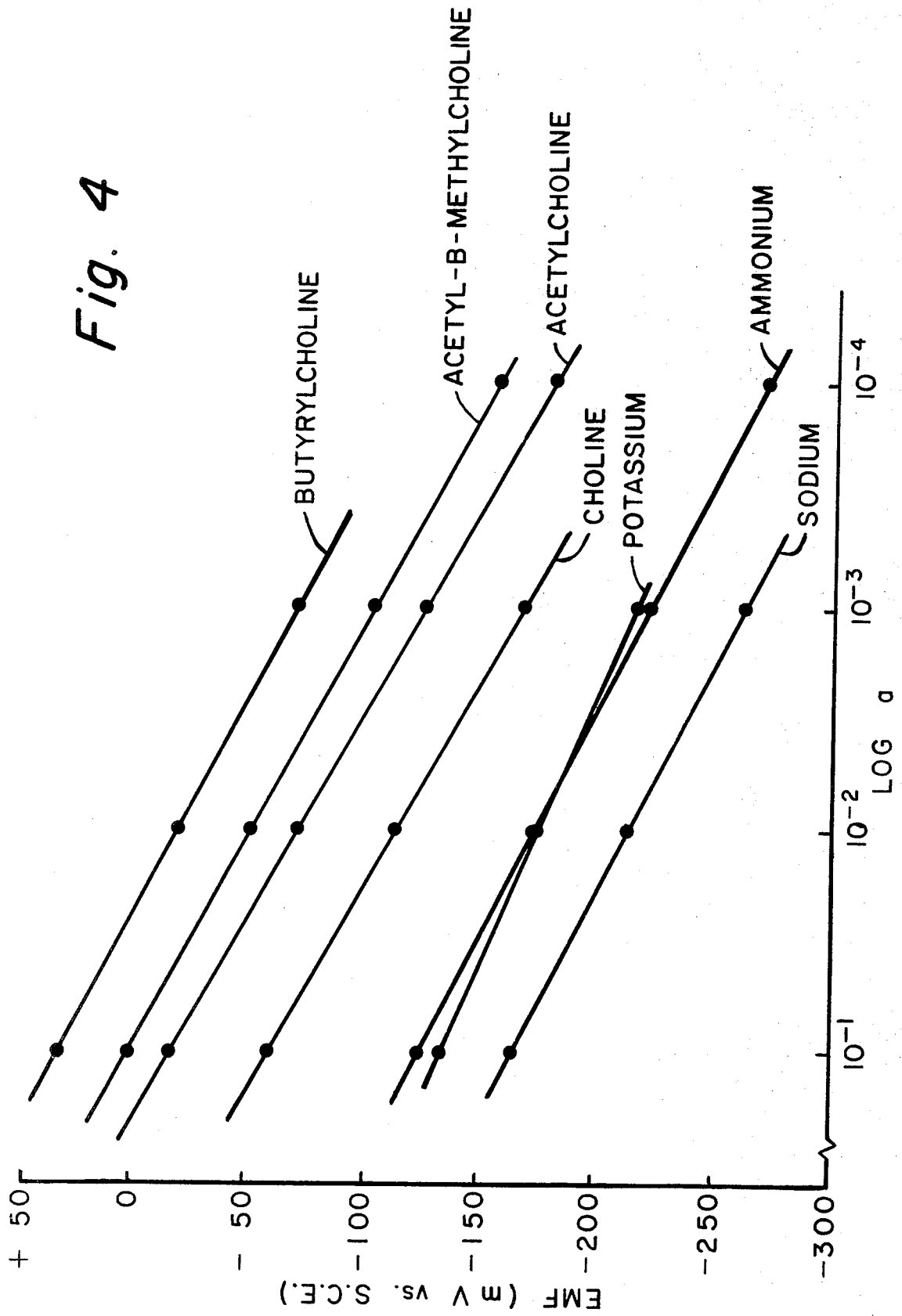
FIG. 4 is a graph comparing the potential response curves of an electrode of the present invention for selected ions of varying concentrations.

The response of the dibutylphthalate plasticized PVC electrodes toward univalent cations was further investigated and those cations and several choline esters were examined in single electrolyte solutions. The results are shown in FIG. 4 which indicates the potential response curves found at the indicated concentrations for butrylcholine, acetyl-B-methylcholine, acetylcholine, choline, ammonium, potassium and sodium species. As can be seen from FIG. 4, the responses essentially follow the relationship given by the first equation discussed under Background of the Invention.

EXAMPLE II

An electrode having the dibutylphthalate-plasticized membrane was also used to determine the activity of serum cholinesterase by measuring the rate of change in concentration of a known amount of acetylcholine after addition of known volumes of serum containing cholinesterase. Cholinesterase is an esterase enzyme which hydrolyzes esters of choline. The rate of change of acetylcholine concentration was monitored by recording the output from an expanded scale pH meter (the Corning Model 12) on a 10 mV full scale recorder using a mercury cell powered zero suppression device. All enzymatic activity determinations were conducted at 25.0° C. The activity was calculated from the slope in the 1–55% hydrolysis region of the enzymatic hydrolysis of acetylcholine by the enzyme acetylcholinesterase. Five quantities of serum containing cholinesterase were added to solutions containing known amounts of acetylcholine. In each case, the activity of the serum cholinesterase was determined and expressed in activity units wherein 1 unit designates the hydrolysis of one micromole of acetylchlorine per minute at pH 8.0 and 25° C. These results are given in Table II.

TABLE II

| Volume/serum added (ml.): | Units/activity found | Units/ml. |
|---|---|---|
| 2 | 0.140 | 0.070 |
| 5 | 0.323 | 0.065 |
| 7 | 0.493 | 0.070 |
| 9 | 0.603 | 0.067 |
| 12 | 0.780 | 0.065 |

As can be seen from Table II, the determined activities of the five samples, expressed in units per ml., were found to be within a range of 0.065 to 0.070, thus indicating a relatively high degree of reliability for the electrode when used for determining acetylcholine concentrations and, consequently, cholinesterase activity.

EXAMPLE III

Comparison With Other Methods

A series of measurements was made to compare the enzymatic activity data obtained with our electrode and the activity data obtainable with a liquid organic phase electrode of the type described in U.S. Pat. No. 3,632,483. Activity data were also obtained through colorimetric techniques using the so-called Hestrin procedure. The activity as determined by the liquid membrane electrode (liquid organic phase, above) was based on equations which do not correct for the electrode response to choline which is produced by the enzymatic hydrolysis of acetylcholine. The results are summarized in Table III.

TABLE III.—COMPARISON OF ACETYLCHOLINESTERASE ASSAY METHODS

|  | Colorimetric procedure | Polymer membrane | Liquid membrane |
|---|---|---|---|
|  | 105 | 139 | 187 |
|  | 117 | 150 | 119 |
|  | 103 | 134 | 140 |
|  | 116 | 146 | 118 |
|  | 107 | 131 |  |
|  | 113 | 126 |  |
| X | 110 | 137 | 141 |
| S.D. | 5.9 | 10.8 | 32.3 |
| Percent C.V. | 5.4 | 7.9 | 23 |

Note.—All data are expressed in International Units (I.U.) per mg. X=average activity; S.D.=standard deviation; Percent C.V.=percent coefficient of variation.

As can be seen from Table III, both the liquid and polymer membrane electrodes yield significantly higher activity values than the colorimetric (Hestrin) procedure. However, it has been pointed out that initial rate activity values for acetylcholinesterase are about 20% higher than is commonly obtained by the Hestrin method which is conducted at conditions leading to 15% and 40% hydrolysis. In our method, activity values are obtained during 1–10% hydrolysis. Further information regarding the Hestrin colorimeter procedure may be found in an article by S. Hestrin, *J. Biol. Chem.*, 180, 249 (1949) and an article by L. T. Kremzner and I. B. Wilson, *J. Biol. Chem.*, 238, 1714 (1963).

In the above experiments it was found that the performance of our polymer membrane electrode was markedly superior to the preferred liquid membrane electrode of U.S. Pat. No. 3,632,483. The polymer membrane electrode has a very short recovery time between assays (1–3 minutes) and the start-up time after an overnight storage is only about 10 minutes. The results obtained with the polymer electrode exhibit significantly less scatter than the results obtained with the liquid membrane electrodes.

EXAMPLE IV

Further Assays

Our electrode was also used for further assays of partially purified acetylcholinesterase solutions. Aliquots of a stock solution, containing approximately 0.5 mg./ml. of acetylcholinesterose were assayed with our membrane electrode procedure. The activity of the solution expressed in I.U., was calculated by known means. The data obtained are given in Table IV. As can be seen from Table IV, the response of the electrode is linear with the volume of enzyme solution added for over a one decade range of volumes.

TABLE IV

Assay of Acetylcholinesterase Solution

| Volume AChE Solution ($\mu$l): | Activity (I.U.) |
|---|---|
| 1 | 0.128 |
| 2 | 0.246 |
| 3 | 0.341 |
| 5 | 0.532 |
| 6 | 0.680 |
| 7 | 0.870 |
| 9 | 1.07 |
| 12 | 1.37 |
| 15 | 1.63 |
| 20 | 2.23 |

By using the choline sensing membrane of our electrode, numerous advantages have been found over the use of the liquid ion exchange electrode. One of the more significant advantages is that a protective cellophane film is not required for our polymer membrane when serum choline determinations are made. This provides not only a simplification in construction, but also a major improvement in reliability since many operational difficulties were attributed to the cellophane film, as noted above.

It should be pointed out that although our polymer membrane electrode represents a significant improvement over those electrodes described in U.S. Pat. No. 3,632,438, many of the teachings in that patent are applicable to the present electrode. One of the more important components for our choline sensitive membranes is the solvent-plasticizer used to plasticize the PVC and solvate the choline ion sensing salt. The detailed examples given were based on using our preferred solvent-plasticizer, dibutylphthalate. Other solvent-plasticizers (e.g., p-nitrophenyl octyl ether and those of the types listed above) were also found to result in operable choine sensing membranes. Accordingly, since our polymer membrane electrode is subject to numerous variations, all within the scope of the present invention, it is intended that the examples given above should be construed as merely illustrative and not limiting.

We claim:
1. An improved electrode for measuring the concentration of the cations of chlorine and its esters in an aqueous solution comprising:
(a) an electrically insulating body having an opening at a portion thereof;
(b) a fused membrane disposed in covering relationship across the opening, the membrane comprising;
(i) a polyvinylchloride matrix containing,
(ii) an ion exchange material having the formula $[(CH_3)_3NCH_2CH_2OR]^+[B(C_6H_4X)_4]^-$ wherein X is chlorine or phenoxy, R is hydrogen or

and R' is lower alkyl or phenyl, and
(iii) a suitable solvent-plasticizer,
(c) an internal reference electrode contained within the body of (a) and in electrical contact with the membrane of (b).

2. The electrode of claim 1 wherein the solvent-plasticizer comprises aromatic diesters of the formula

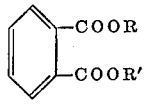

wherein R and R' are alkyl groups each having 4 to 18 carbon atoms.

3. The electrode of claim 2 wherein the aromatic diester is dibutylphthalate.

4. The electrode of claim 1, wherein the solvent-plasticizer is a trialkylphosphate, the alkyl groups each having 4 to 18 carbon atoms.

5. The electrode of claim 4 wherein the trialkylphosphate is selected from the group consisting of trioctylphosphate and tributylphosphate.

6. The electrode of claim 1, wherein the solvent-plasticizer is a nitroaromatic compound of the formula

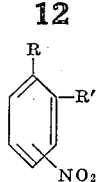

wherein R is a member selected from the class consisting of hydrogen, an alkyl group having 1–14 carbon atoms, lower alkoxy, and alkylcarboxy, and R' is a member selected from the class consisting of hydrogen and an alkyl having less than 4 carbon atoms.

7. The electrode of claim 6 wherein the nitroaromatic compound is p-nitrophenyl octyl ether.

8. The electrode of claim 1 wherein the membrane has a thickness between about 10 to about 25 mils.

9. The electrode of claim 1 wherein the weight of ion exchange material to solvent-plasticizer is about 0.5 to 5.0%.

10. The electrode of claim 1, wherein the insulating body of (a) is a plastic material, and the membrane of (b) has a thickness between about 10 to about 25 mils and comprises a polyvinyl chloride matrix containing acetylcholine tetra (p-chlorophenyl) borate as the ion exchanger and dibutylphthalate as the solvent-plasticizer.

References Cited
UNITED STATES PATENTS

| | | | |
|---|---|---|---|
| 3,632,483 | 1/1972 | Baum | 204—195 L |
| 3,655,526 | 4/1972 | Christian | 204—195 |
| 3,691,047 | 9/1972 | Ross et al. | 204—195 M |

OTHER REFERENCES

Higuchi et al., "Anal. Chem.," vol. 42, No. 13, November 1970, pp. 1674–1676.

Moody et al., "Analyst," November 1970, vol 95, pp. 910–918.

TA-HSUNG TUNG, Primary Examiner

U.S. Cl. X.R.
204—1T, 195 L

UNITED STATES PATENT OFFICE
CERTIFICATE OF CORRECTION

Patent No. 3,840,452                    Dated October 8, 1974

Inventor(s) George Baum and Merrill Lynn

It is certified that error appears in the above-identified patent and that said Letters Patent are hereby corrected as shown below:

Column 3, line 3, change "brances" to -- branes --.

Column 3, line 47, change "Analysis" to -- Analyst --.

Column 4, line 8, change "terephenylborate" to -- tetraphenylborate --.

Column 4, line 70, change "he" to -- the --.

Column 6, line 23, change "rsein" to -- resin --.

Column 6, line 71, change "palstic" to -- plastic --.

Column 7, line 16, change "10" to -- 19 --.

Column 7, line 22, change "mmebrane" to -- membrane --.

Column 7, line 23, change "a nO-ring" to -- an O-ring --.

Column 8, line 37, change "sheets." to -- sheet. --.

Column 9, line 17, change "1-55%" to -- 1-5% --.

Column 9, line 24, change "acetylchlorine" to -- acetylcholine --.

Column 10, line 28, change "acetylcholinesterose" to -- acetylcholinesterase --.

Column 10, line 70, change "choine" to -- choline --.

Column 11, Claim 1, line 3, change "chlorine" to -- choline --.

Signed and sealed this 11th day of March 1975.

(SEAL)
Attest:

RUTH C. MASON
Attesting Officer

C. MARSHALL DANN
Commissioner of Patents
and Trademarks